United States Patent
Caramaro et al.

(10) Patent No.: US 6,733,845 B1
(45) Date of Patent: May 11, 2004

(54) PROCESS FOR ELECTROSTATIC IMPREGNATION OF A POWDER INTO A NETWORK

(75) Inventors: Laurence Caramaro, Chalens (FR); Gérard Lamure, Villieu Loyes Mollon (FR)

(73) Assignee: Materials Technics Societe Anonyme Holding (LU)

( * ) Notice: Subject to any disclaimer, the term of this patent is extended or adjusted under 35 U.S.C. 154(b) by 0 days.

(21) Appl. No.: 09/562,170

(22) Filed: May 2, 2000

Related U.S. Application Data

(63) Continuation of application No. PCT/IB98/01738, filed on Nov. 2, 1998.

(30) Foreign Application Priority Data

Nov. 4, 1997 (EP) .............................. 97810826

(51) Int. Cl.⁷ ................................. B05D 1/04
(52) U.S. Cl. ....................... 427/477; 427/482; 427/485; 427/475
(58) Field of Search ................. 427/459, 460, 427/461, 477, 482, 485

(56) References Cited

U.S. PATENT DOCUMENTS

| | | | |
|---|---|---|---|
| 3,813,269 A | | 5/1974 | Molbert |
| 3,919,437 A | * | 11/1975 | Brown et al. |
| 4,246,308 A | * | 1/1981 | Walsh |
| 4,775,566 A | * | 10/1988 | Landry et al. |
| 5,248,400 A | * | 9/1993 | Franks et al. |
| 5,302,419 A | * | 4/1994 | Muzzy |
| 5,811,158 A | * | 9/1998 | Yasuda et al. |

FOREIGN PATENT DOCUMENTS

| | | |
|---|---|---|
| FR | 2 258 254 | 8/1975 |
| WO | 91 08256 | 6/1991 |
| WO | 92 20521 | 11/1992 |

OTHER PUBLICATIONS

"On the Role of Electric Forces in the Processing of Composites Prepared With Polymeric Matrices" Polymer Eng. & Sci., vol. 76, #8, 1996.*

Yurkevich O R: "On the Role of Electric Forces in the Processing of Composites Prepared with Polymeric Matrices"; Polymer Engineering & Science; vol. 36, No. 8, Apr. 1, 1996, pp. 1087–1091.

Thoren J L., et al.; "Electrostatic Dry Powder Prepregging of Carbon Fiber"; International Sampe Symposium and Exhibition; vol. 35, No. 2, Jan. 1, 1990, pp. 2086–2101.

Miller, A., et al.; "Impregnation Techniques for Thermoplastic Matrix Composites"; Polymers and Polymer Composites, vol. 4, No. 7, 1996, 459–481.

* cited by examiner

Primary Examiner—Fred J. Parker
(74) Attorney, Agent, or Firm—Sturm & Fix LLP

(57) ABSTRACT

The invention concerns an impregnation method for producing in particular a composite material comprising a fiber or filament array and a continuous matrix, rigid or flexible, with which said array is in close contact. The method is characterized in that said matrix is incorporated in said array in powder form before being transformed to constitute the continuous matrix. It consists in placing the powder and said fiber or filament in an electrostatic field with an alternating current voltage of at least 20 kV for at least 5 s.

15 Claims, No Drawings

PROCESS FOR ELECTROSTATIC IMPREGNATION OF A POWDER INTO A NETWORK

This application is a continuation of PCT/IB98/01738, filed Nov. 2, 1998 which claims priority to EPO 97810826.4 filed Nov. 4, 1997.

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates to a process for the impregnation of a fibrous or a filamentary network with powder, especially for producing a composite comprising a continuous, rigid or flexible, matrix with which said network is in intimate contact. This invention relates not only to the composite obtained by this process but also to a preform for the composite obtained according to this process.

2. Description of the Prior Art

Composites reinforced by fibers embedded in thermoplastic matrices are a category of extremely useful materials, making it possible in particular to produce materials having excellent mechanical properties for masses substantially less than those of metals. Furthermore, these materials are obtained by simple molding, after having coated the reinforcing fibers or filaments with the thermoplastic resin intended to form the matrix of the composite. Of course, the mechanical properties of the composite thus obtained depend on the quality of the interface between the reinforcing fibers or filaments and the matrix.

This therefore assumes that there is good cohesion between the fibers or filaments and the matrix. Two factors essentially determine this cohesion; these are, on the one hand, the adhesion properties between the resin and the reinforcing fibers or filaments, that is to say the choice of the material intended to form the matrix, and, on the other hand, the void content within the composite. This second factor obviously results from the ability of the resin to infiltrate between the fibers or filaments of the fibrous mass. This is because each fiber or filament, or each portion of fiber or filament, which is not embedded in the matrix does not contribute, or contributes only partially, to the mechanical properties of the composite. Consequently, the void content correspondingly reduces the mechanical properties of the composite.

In conventional processes proposed for incorporating the thermoplastic resin into the fibrous or filamentary mass, the resin is melted in order make it penetrate in the liquid state into the fibrous or filamentary mass to be impregnated, after which this fibrous mass thus impregnated may be molded in order to give it the shape of the composite component that it is desired to obtain. The drawback of this approach stems from the difficulty in making the molten resin penetrate perfectly between the fibers or filaments on account of the viscosity of these resins.

Among the processes used for trying to remedy this drawback, the post-impregnation of fabric has already been proposed, by passing it through a bath containing the thermoplastic matrix in a suitable solvent. The drawbacks of this process are well known and are those associated with the use of solvents, namely the to need to recover the solvent, the risk of not completely recovering it and the hygiene problems. Furthermore, and something which is perhaps the most troublesome, is that it is the highest-performance resins that are inert with respect to the main solvents.

It has also been proposed to incorporate the thermoplastic matrix using a weaving process known by the name "Comingle" in which a mixture of reinforcing fibers and matrix fibers are woven. After weaving, the woven is heated, in order to make the matrix present in the form of fibers melt, and is then compressed, in order to obtain the desired component. During the heating, and during the compression, it is necessary for the matrix in the form of fibers to melt and then migrate, in order to penetrate between the reinforcing fibers. It is not obvious how to obtain a homogeneous distribution of the matrix in this way.

Various solutions have been proposed in order to try to remedy this drawback and to allow the void content to be reduced. Thus, in EP-B1-0,226,420, EP-B1-0,354,139 and EP-B1-0,466,618 it has been proposed to form yarns comprising a mixture of reinforcing fibers or filaments, such as glass, aramid or carbon reinforcing fibers or filaments, with thermoplastic fibers. Once these yarns have been placed in a mold so as to form the desired reinforcing structure, the thermoplastic of the yarn is melted to form the matrix, so that the reinforcing fibers or filaments mixed with the thermoplastic fibers are embedded in the thermoplastic matrix. Given that the thermoplastic fibers are mixed intimately in the composite yarn with the reinforcing fibers or filaments, the void content of the composite obtained is low.

The drawback of this solution is that the cost of producing such a composite yarn is high, so that this is a solution at the very most reserved for rare applications for a few top-of-the-range products or products requiring advanced technologies. On the other hand, its cost does not make this solution competitive for most applications in which the abovementioned conventional coating technique continues to be used.

It has already been proposed to introduce the matrix in powder form into a yarn or into a fibrous mass consisting of a woven or a nonwoven. Thus, a process has been proposed in which a yarn is impregnated with powder of small particle size in a fluidized bed in which the powder is held in suspension. The powder-coated yarn is then coated with a sheath of thermoplastic compatible in nature with that of the powder. This process, known by the name FIT, is used for the manufacture of a flexible prepreg capable of being woven. However, it should be noted that the flexibility of the prepreg depends on the thickness of the extruded sheath. If this sheath is very thin, the prepreg is actually flexible but the sheath is brittle; if the sheath if thick, it is less brittle but the prepreg is then less flexible.

In order for this prepreg to retain its flexibility, the powder must not melt inside the sheath. Consequently, it can migrate within the yarn during handling operations. The polymer of which the sheath is composed and which, in the end product, will contribute to the formation of the matrix, will be unable to contribute to the cohesion of the end product unless it migrates sufficiently between the reinforcing fibers and unless it is subjected to sufficiently high compression.

Another category of technique uses, in particular, fiberglass mats. These mats are impregnated with molten polymer by the calendering of thermoplastic films, by the compression molding of resin films and of mats, by the casting of molten polymer between two mats sandwiched by two calendered polymer films or else by the electrostatic spraying of powdered resin onto the mat followed by the melting of the matrix and compression of the assembly.

FR 2,258,254 has proposed a DC electrostatic spraying process for introducing powder into a fibrous material. Such a process is similar to that of electrostatic painting. The powder bonds to the first fibers that it encounters, so that it rapidly blocks the pores in the network and prevents its penetration. This is confirmed by the low fiber content of the specimens tested by the authors of that document.

O. R. Yurkevitch has described, in an article entitled "On the role of electric forces in the processing of composites prepared with polymeric matrices" in Polymer Engineering & Science, Vol. 36, No.8, Apr. 1 1996, pages 1087–1091, an impregnation process in which a fluidized bed is formed from the powder to be impregnated and this powder is at the same time charged in an electrostatic field. The powder is kept moving by the fluidized bed and the charges that are induced on the moving particles are attracted by the filaments to be coated, so that better penetration of the powder should be obtained. However, it should be noted that the tested specimens according to that document are formed from ten superimposed pre-impregnated layers which are hot pressed in order to produce the composite, a situation which does not make it possible to know whether the process does actually allow the powder to penetrate into the core of the fibrous network.

In any case, and even if it is capable of effectively impregnating a fibrous network, something which we do not know, such a process using a fluidized bed in a high-voltage electrostatic field is difficult to control. The combination of the two techniques therefore constitutes an obvious complication, causing problems during industrial application of this process.

Finally, mention may be made of the papermaking technique which consists in chopping the fibers and dispersing them with a powdered thermoplastic resin in a large amount of water and then in filtering the water in order to obtain a felt. This felt is heated and compressed in order to melt the resin. However, this technique is limited to the use of short fibers, giving a composite whose mechanical properties are inferior to those with long fibers.

It has already been proposed to use an electrostatic field to distribute the powder on or in a substrate when the latter is porous.

Thus, in particular, WO-92/15404 relates to a process for manufacturing substrates for electronic circuits, in which bundles of fibers are electrostatically coated with thermoplastic powder and this powder is melted in order for the liquid material to penetrate into the bundles and embed the filaments. In order to increase the electrical conductivity of the filaments, they are wetted. The amount of resin is between 35 and 70% by weight of the composite.

As may be seen, this process does not make it possible to introduce powder between the fibers or the filaments, given that the plastic penetrates by infiltrating the latter in the liquid state, with all the problems mentioned above.

In U.S. Pat. No. 3,817,211, bundles of continuous filaments are brought into a fluidized bed of electrostatically charged powder, the filaments themselves passing over electrodes in order to charge them to the same potential but of opposite sign to that of the powder. The filaments thus electrostatically charged repel each other and allow the powder attracted by them to penetrate between the filaments and adhere to them. To improve the electrostatic charging of the filaments, they are wetted. Each filament in the bundle of filaments may thus be coated individually. According to that document, the filaments thus coated with powder are arranged in bundles and wovens may then be manufactured using these powder-coated bundles. Such a process is therefore not directly applicable to a woven or a nonwoven. It is not applicable to fiber spun yarns either, but is only applicable to continuous filaments.

It has already been proposed in U.S. Pat. No. 2,820,716 to introduce a binder into a nonwoven, in which the powder is charged to a potential and brought so as to face an electrode of opposite potential by interposing the nonwoven between the powder and the electrode so that the powder, attracted by the electrode, penetrates into the nonwoven which lies in its path. Here, the powder is preferably a thermoplastic binder softened by heating and then cooled in order to bond the fibers of the nonwoven fabric together. Bearing in mind the objective pursued by that invention, the amount of binder incorporated into the nonwoven can in no case be done so in proportions suitable for producing a matrix for a composite, otherwise the fibers or filaments of the nonwoven would not be bonded by the binder but embedded in the latter. This would then no longer be a nonwoven, the role of the binder being, as its name indicates, only to give the nonwoven cohesion by binding the fibers or filaments to the points of contact.

A process has also been proposed in EP-B1-0,502,900, for sintering a composite, in which powders of polymer material and/or of mineral material to which a metal powder is added are electrostatically charged and mixed. Reinforcing fibers are powder-coated with this powder mixture, possibly stacking several successive powder-coated layers, and a new electrostatic treatment is carried out in order to make the powder penetrate into the fibrous network.

Apart from the fact that this process applies only to a mixture of powders that differ in nature, there is above all the need firstly to charge the powder, a woven is then powder-coated using this powder, various layers of woven thus powder-coated are stacked and then subjected to an electrostatic field for the purpose of making the powder, spread over the various layers by powder coating, penetrate into the fibrous network.

DETAILED DESCRIPTION OF THE INVENTION

The object of the present invention is to provide a solution which makes it possible to distribute powdered material, especially powdered material intended to form a matrix of a composite reinforced by fibers or filaments, within a fibrous or filamentary mass, so as to offer an economical and high-performance process capable of remedying, at least partially, the drawbacks of the known solutions of the prior art.

For this purpose, the subject of the present invention is a process for producing a composite comprising a network of fibers or of filaments and a rigid or flexible matrix with which said network is in intimate contact, in which process said matrix is incorporated into said network in the form of a powder before being converted so as to form said matrix. The subject of the invention is also the composite obtained according to the process of the present invention, as well as a preform for a composite having a thermoplastic matrix obtained according to the process of the process of the present invention.

Unexpectedly, the inventors have discovered a process, forming the subject of the present invention, in which it is possible to make an amount of powder capable of forming a matrix for a rigid or flexible composite penetrate into a woven or nonwoven, fibrous or filamentary network by simultaneously subjecting the powder and the fibrous or filamentary network to an electrostatic field at an AC voltage greater than 20 kV for a time of at least 5 seconds.

Contrary to what the documents of the prior art may lead one to believe, the appropriate amount of powder may be introduced right into the fibrous or filamentary materials, even when this material has a relatively large thickness, directly on the woven or the nonwoven, at the very least on certain types of wovens and nonwovens.

The results obtained make it possible to envisage the production of composites whose mechanical properties are straight away comparable to those of products obtained by conventional processes. However, the implementation of this process, which can be carried out in line, should allow a reduction in the manufacturing and processing costs of the material.

The voltage of the electrostatic field applied is an AC voltage, preferably of between 20 and 150 kV. Advantageously, the particle size of the powder is less than 200 µm, preferably less than 60 µm. It will also be preferable to use textile surfaces or volumes having a construction with suitable porosity, in the form of nonwovens, wovens, knits, braids, rovings or other assemblies, which are referred to in the present description by the name fibrous or filamentary networks.

The advantages of the proposed solution reside especially in the fact that the operation of impregnating the fibrous mass with the powder may be carried out in a single operation. Once the fibrous or filamentary mass has been impregnated, all that is then required is to subject it to a heating operation at a temperature at which the powdered thermoplastic melts, and then to cool. Of course, depending on the desired shape of the composite component, the heating operation may be carried out in a mold intended to give this composite the shape of the desired component. Moreover, it is perfectly conceivable to carry out the impregnation according to the present invention on a preformed fibrous or filamentary mass. To impregnate the powder into the fibrous mass, a slight pressure will be exerted during the molding in order to make the molten thermoplastic flow during this heating operation, given that the material of the thermoplastic matrix has already been distributed within the fibrous or filamentary mass during the electrostatic impregnation operation forming the subject of the present invention.

Other features and advantages of the present invention will become apparent on reading the description which follows and the examples which will illustrate it.

The examples which will be described below are all produced with the aid of a prototype plant using two superposed parallel metal plates which are connected to the respective two poles of an electrostatic generator and thus form two electrodes intended to generate an electrostatic field between them. The respective faces placed so that each of these metal plates faces the other are covered with a dielectric plate, for example a glass-ceramic plate. The powder intended to impregnate the network of fibers or filaments, for the purpose of forming a composite, is preferably uniformly distributed over the insulating plate covering the lower metal plate. It may also be distributed on the fibrous network to be impregnated itself. The network of fibers or filaments is placed on top of the powder between the two electrodes.

The distance between the metal plates forming the electrodes may vary from 1 to 50 mm. Since the phenomenon is sensitive to the field, the voltage must be tailored to the spacing between the electrodes. The interelectrode distance makes it possible to vary the current from 5 mA to 50 mA. This is because when the interelectrode distance increases, the capacitance of the capacitor formed by the two metal plates decreases, thereby lowering the charge and hence the current.

Among the other parameters studied for implementing the process according to the present invention, it has been found that, for the same voltage, good results were obtained which with an AC voltage, the DC voltage not allowing the powder to penetrate. The nature and particle size of the powder, as well as the density/particle size ratio are also parameters which are of importance in the results obtained. Moreover, it is obvious that the powder must not have a tendency to agglomerate if it is desired to guarantee the best penetration of this powder into the network of fibers or filaments. It has been found that it could be useful with certain powders to add an additive intended to improve the ability to flow. Thus, the powder manufacturer has added 0.3% by weight of alumina, in order to prevent the powder from agglomerating, this additive being known as an "anticlumping" agent, to a nylon-12 powder sold under the brand ORGASOL® by the company Atochem. It has also been found that it is more difficult to obtain good results with powders whose particle size is greater than 200 µm. From tests carried out, it would seem that the particle size of the powder must be smaller the higher the density of the material.

Among the other factors which it has been able to demonstrate, mention may be made of the fact that it has been found that the impregnation of the powder into the network of fibers or filaments is improved when the sizing of these fibers or filaments has been removed before they are subjected to the electrostatic impregnation operation. This is because the sizing has the tendency to stick the fibers or filaments together and consequently to prevent them separating.

Another parameter which has been studied is that of the treatment time. It has not been possible to find appreciable differences in the amount of powder incorporated into a given network of fibers or filaments beyond 5 seconds of application of the electrostatic field with an AC voltage. Nor has it been possible to find, using a scanning electron microscope, any modification to the surface of the fibers subjected to such an electrostatic field for a relatively long time (up to 5 minutes).

On the other hand, it has been found, from the composites produced using the fibrous or filamentary networks powder-coated according to the process forming the subject of the present invention, that there is an improvement in the measured properties with the time for which the electrostatic field was applied during the electrostatic powder-coating process. It may be assumed that this improvement is due either to oxidation of the surface of the fibers or filaments when they are subjected to the electrostatic field, which would increase the fiber/matrix adhesion and consequently the mechanical results of the composite obtained, or to the fact that the powder becomes better distributed in the fibrous network with time, or else to the combination of the two phenomena.

The tests that we carried out using the abovementioned plant and a 30 kV generator, with an AC voltage, have shown that fibers of dielectric materials, such as glass, aramid or HM polyethylene (DYNEEMA®), allow these fibers or filaments to build up charges on the surface which have a tendency to oppose the field which has given rise to them. As a result, all these fibers charge up to the same potential and consequently have a tendency to repel each other, thus making penetration of the powder easier.

In the case of conducting fibers such as carbon fibers, it is conceivable to apply a greater potential difference, typically>30 kV, in order to build up sufficient surface charges for the purpose of obtaining an effect on the spacing of the fibers or of the filaments.

As was mentioned in the above discussion, the impregnation of the powder into a network of fibers or filaments depends on various factors, among which the spacing between the fibers, which can be increased or indeed created by the repulsion between the fibers subjected to an electric field, and the particle size of the powder obviously play an important role.

Consequently, the construction of the network of fibers or filaments plays a role. Thus, nonwovens have a priori a construction favorable to impregnation by the powder in an electric field. Among wovens, it is preferably advisable to tend toward weaves in which the fibers are not too closely spaced, such as a roving for example. If the woven has too close a weave, it is virtually impossible to separate the fibers sufficiently to make the powder penetrate into the woven. In general, the finer the multifilament yarn or the fiber spun yarn used, the closer the woven obtained. Thus, a cloth weave may be close with a fine yarn but, with a coarse multifilament, especially a coarse glass multifilament, given the 1/1 construction of the cloth, it is not possible to obtain a woven having a very close weave from a relatively coarse glass multifilament.

The grammage of the woven is of less importance than its construction. However, it may be mentioned that best results have been found with wovens whose grammage is >300 g/m$^2$. Without doubt this stems from the fact that wovens whose grammage is less than this value often consist of very closely spaced fine yarns.

Among the wovens that we have tested, we have obtained very useful results on a 700 g/m$^2$ fiberglass woven having a cloth weave comprising 3 yarns/cm, into which the powder has been made to thoroughly penetrate. This is therefore a woven made from a coarse yarn, so that the cloth weave does not result in very closely spaced yarns which can be well penetrated by the powder, when the woven is placed in an electrostatic field.

It has been more difficult to test wovens made of aramid fibers because those that are available on the market are generally very closely woven. On the other hand, the tests carried out on aramid fibers by themselves show that, for a similar weave of wovens, one ought to obtain, with regard to the amounts and distribution of the powders, results comparable to those of a glass woven.

It has not been possible, with the textile materials tested, to find any difference between those that were conditioned in an atmosphere having a relative humidity content of 65% compared with those conditioned under conditions of ambient humidity in which the humidity content may vary from 30 to 60%. With regard to the powder, wetting is not desirable given that this has a tendency to agglomerate the powder.

We will now examine a few examples of composites produced from various reinforcing wovens or nonwovens into which thermoplastic powder has been introduced by powder coating using the process forming the subject of the present invention.

EXAMPLE 1

The woven used was a 700 g/m$^2$ fiberglass woven with a cloth weave from the firm Vetrotex and six specimens were formed. The results correspond to averages obtained on these specimens which, moreover, have consistent properties. The powder used is a nylon-12 powder sold under the brand ORGASOL® by the firm Atochem. The particle size of this powder is 20 μm. The powder and the woven were subjected, under the abovementioned conditions, to the electric field for a time of 30 seconds and the separation of the electrodes between which the powder and the woven are placed is 10 mm.

After having carried out the electrostatic impregnation operation, a sheet of composite is produced, by making the powder distributed between the fibers of the woven melt, and then the assembly is cooled until the composite is at room temperature. A small sheet of composite 2.3 mm in thickness is obtained, which has a bulk density of 1.97 g/cm$^3$ with a void content of 0.4% and a mass percentage of resin of 21% corresponding to a volume content of 40%. The mechanical properties measured on these specimens are 129 MPa in the case of the flexural strength and 15.2 GPa in the case of the flexural modulus of elasticity.

EXAMPLE 2

The woven and the powder used are the same as in Example 1 and the distance between the electrodes is the same, but the powder and the glass woven were subjected to the 30 kV AC voltage electric field for a time of 2 minutes.

The measured results are interesting to observe, insofar as only one parameter has changed between this example and the previous one, namely the time. In this example, the number of specimens is 9. The average of the results shows results almost identical in the case of the 2.3 mm thickness, the 1.94 g/cm$^3$ bulk density, the 21% mass percentage of resin and the 39% volume content of the matrix. What is found is that there is a slightly higher void content, of 1.6%, but above all it is found that there is a substantial improvement in the flexural strength, which increases to 151 MPa, as well as an improvement in the flexural modulus of elasticity, which is 16.5 GPa. This example makes it possible to confirm what was stated previously, namely that there is an improvement in the measured mechanical properties without a variation in the powder content or in the void content, which is even slightly higher, something which would tend to make one think that it is with regard to the adhesion between the fibers and the matrix that an improvement is obtained, although this is not proven by a measurable indicator in the current state of the tests performed.

Apart from the two examples mentioned above, made using fiberglass wovens from which sheets of composites were produced, so as to measure their mechanical properties, a series of electrostatic powder-coating tests was also carried out exclusively on fiberglass nonwovens in order to compare the mass percentage of powder with the mass of fibrous material. Tests were also carried out by superposing up to five layers of nonwoven so as to see whether it was possible to introduce powder into such a thickness of fibrous mass. The nonwoven on which the tests were carried out is a fiberglass nonwoven from the firm Vetrotex, sold under the brand name UNIFILO®. This is a 330 g/m$^2$ nonwoven which was needle-punched and several layers of which were joined together by needle punching.

EXAMPLE 3

This example was made from a layer of the abovementioned nonwoven and from the polypropylene (PP) powder sold under the brand name COATHYLENE® by Plast-Labor S.A., the particle size of which is between 38 and 98

μm. The initial mass ratio of the powder to the nonwoven was 1.35. The powder and the nonwoven were subjected to the 30 kV AC voltage electrostatic field for 1 minute and the distance separating the electrodes between which the powder and the nonwoven were placed as indicated previously is 10 mm. A powder percentage of 42% in the nonwoven was measured, which constitutes quite a satisfactory amount. Furthermore, the observed distribution of the powder in the nonwoven is good.

EXAMPLE 4

This example was made on two layers of 330 g/m² UNIFILO® nonwoven, each with the aid of the abovementioned PA-12 powder used, for Examples 1 and 2, the powder being milled in a milling drum. The treatment conditions were the same as in Example 3. The initial powder/nonwoven mass ratio is 1. The percentage of powder measured in the nonwoven is 32.30% with good distribution of the powder within the nonwoven.

EXAMPLE 5

This example is identical to the previous one, but the powder used in this case is PP powder in an initial powder/nonwoven mass ratio of 1.13. The proportion of powder measured in the nonwoven is 43% with good distribution within the nonwoven.

EXAMPLE 6

This example used three superposed layers needle-punched together from the nonwoven of Examples 3 to 5 which were powder-coated according to the electrostatic powder-coating process forming the subject of the present invention with PP powder in an initial powder/nonwoven mass ratio of 1. The other conditions are identical to those in Examples 3 to 5. The proportion of powder measured in the woven is 42% with good distribution of the powder within the nonwoven. This example may be considered as being very important and it shows that it is perfectly possible to infiltrate a 960 g/m² fibrous mass with the powder by the process forming the subject of the present invention.

EXAMPLE 7

This example was made from five superposed needle-punched layers of the same nonwoven as in the previous examples, representing a mass of 1650 g/m². In this example, the initial powder mass was in a ratio of 1/1 with that of the nonwoven, but half the powder was distributed beneath the nonwoven and half above it. The other parameters, namely the time and the distance, were similar to those in Examples 3 to 6. The measured proportion of powder increased to 44%, which is excellent, and the observed distribution within the layers is good.

The examples made were limited, especially by the powders available on the market as well as by the wovens or nonwovens. However, the results obtained up till now prove the feasibility of this process and show what are the main parameters needed to implement this process. It is obvious that the invention is in no way limited to the above examples but, on the contrary, may be extended to other textile materials, especially knits, to other reinforcing fibers or filaments and to other types of powders, such as ceramic powders for the production of matrices by sintering.

By way of comparison, table I below gives results in comparison with a commercial composite known under the brand name TRE.

Up till now the process according to the invention has been described as a process intended to introduce, in one operation, the amount of powder needed to produce the thermoplastic matrix.

According to a variant of this process, it is also possible, in certain cases, to introduce this matrix in two steps, the first step consisting of a powder-coating step which is not necessarily carried out electrostatically. This is because the role of this first step is to introduce an amount of powder which is not sufficient to produce the matrix but sufficient to make a preform of the component to be produced, the role of this powder being to allow the network of fibers or filaments to retain, after cooling, the desired shape of the component. Next, during the second step, this preform is subjected to an electrostatic impregnation operation, as described previously, for the purpose of introducing the remaining amount of powder needed to produce the matrix into this preform.

Although the application of the impregnation process according to the invention is more particularly intended for the manufacture of composites, it will also be possible to add other powders during the impregnation of the network of fibers or filaments, or indeed to impregnate this network only with these other powders, if it desired to impregnate these networks for a purpose other than that of incorporating the matrix of a composite thereinto. Thus, it would be possible to impregnate with other powders, such as mineral powders, powders of thermosetting polymers or powders of blowing agents, for example.

The powder used for the impregnation may also serve to introduce one or more additional functions into the textile. Thus, it would be possible to incorporate, for example, conducting, antibacterial or antifungal powders, by themselves or as a mixture with another powder. It would also be possible to introduce fillers giving the material lightening and/or insulation properties, for example hollow balls or blowing agents. In order to immobilize these powders or fillers in the textile structure, it is necessary to coat it with a resin, something which can be done using conventional techniques.

Finally, the powder serving to introduce an additional function into the material may also, in the case of a composite, be introduced by mixing said powder with that of the matrix.

According to other examples, which are limited to powder coating and to the measurement of the proportion of powder incorporated into the fibrous material, consisting here of 3 or 4 layers of UNIFILO® nonwoven, other powders or fillers were incorporated. These tests were performed with electrodes in the form of plates separated by 10 mm and with an AC current whose voltage varied between 40 and 50 kV.

EXAMPLE 8

In this example, 42% by weight of 60 μm PP was incorporated into three needle-punched UNIFILO® layers by applying the electrostatic field for 30 seconds.

EXAMPLE 9

42% by weight of hollow glass microspheres were incorporated into four needle-punched UNIFILO® layers. The impregnation process was carried out by applying the electrostatic field for 2 minutes.

EXAMPLE 10

42% of powdered PPS was incorporated into a needle-punched fabric consisting of four layers of UNIFILO®, by applying the electrostatic field for 2 minutes. It should be noted that more than 72% of the initial powder was incorporated.

TABLE I

| SPECIMEN | Fiber content (%) | Void content (%) | Flexural strength (MPa) | | Flexural modulus (GPa) | |
|---|---|---|---|---|---|---|
| | | | Warp | Filling | Warp | Filling |
| TRE | 38 | 1.09 | 87 | 121 | 3.035 | 4.300 |
| Sheet 1 | 50 | 4.47 | 134 | 136 | 6.338 | 6.213 |
| Sheet 4 | 44 | −0.3 | 137 | 139 | 5.54 | 5.419 |
| Sheet 5 | 44 | 4.71 | 105 | 122 | 4.562 | 5.174 |
| Sheet 8 | 44 | 1.19 | 142 | 144 | 5.732 | 5.747 |
| Sheet 11 | 50 | 1.08 | 134 | 130 | 5.809 | 5.643 |
| Sheet 12 | 46 | 0.20 | 127 | 145 | 5.687 | 6.329 |

What is claimed is:

1. A process for the electrostatic impregnation into a fibrous or filamentary network with powder, for producing a composite comprising a rigid or flexible matrix with which said network is in intimate contact, wherein the powder and said network of fibers or filaments are placed between two electrodes, said electrodes being electrically isolated insulated from each other and said electrodes being connected respectively to the oppositely charged poles of an AC voltage electrostatic generator so as to simultaneously subject said powder and said fibrous or filamentary network lying between said electrodes to an electrostatic field, the AC voltage of which is at least 5kV, for a time of at least 2 seconds.

2. The process according to claim 1, wherein the AC voltage of said electrostatic field is between 5 and 200 kV.

3. The process according to claim 1, wherein the particle size of the powder is less than 400 μm.

4. The process according to claim 1, wherein said fibers or filaments are made of a material whose Young's modulus is greater than 50 GPa.

5. The process according to claim 1, wherein said network of fibers or filaments is in the form of a nonwoven.

6. The process according to claim 1, wherein said network of fibers or filaments is in the form of a woven.

7. The process according to claim 1, wherein said network of fibers or filaments is in the form of a knit.

8. The process according to claim 1, wherein said network of filaments is in the form of a roving.

9. The process according to claim 1, wherein said network of fibers or filaments is subjected to a prior desizing operation.

10. The process according to claim 1, wherein an additive is added to said powder to reduce the tendency to stick together and to agglomerate.

11. The process according to claim 1, wherein said network of fibers or filaments is placed between two sources of the powder.

12. The process according to claim 1, wherein the grammage of said network of fibers or filaments is between 5 and 3000 g/m$^2$.

13. The process according to claim 1, wherein said matrix is made of a thermoplastic.

14. The process according to claim 1, wherein said matrix is firstly impregnated with an amount of powdered thermoplastic capable of forming a preform and then said preform is placed in said electrostatic field with said powder in order to impregnate a remaining amount of powder needed to form said matrix.

15. The process according to claim 1, wherein the two electrodes are covered with a dielectric plate.

* * * * *